US012462730B2

(12) United States Patent
Chaji

(10) Patent No.: US 12,462,730 B2
(45) Date of Patent: Nov. 4, 2025

(54) OPTOELECTRONIC ARRAY

(71) Applicant: VueReal Inc., Waterloo (CA)

(72) Inventor: Gholamreza Chaji, Waterloo (CA)

(73) Assignee: VueReal Inc., Waterloo (CA)

(*) Notice: Subject to any disclaimer, the term of this patent is extended or adjusted under 35 U.S.C. 154(b) by 0 days.

(21) Appl. No.: 18/568,977

(22) PCT Filed: Jun. 10, 2022

(86) PCT No.: PCT/CA2022/050931
§ 371 (c)(1),
(2) Date: Dec. 11, 2023

(87) PCT Pub. No.: WO2022/256938
PCT Pub. Date: Dec. 15, 2022

(65) Prior Publication Data

US 2024/0282242 A1 Aug. 22, 2024

Related U.S. Application Data

(60) Provisional application No. 63/209,445, filed on Jun. 11, 2021.

(51) Int. Cl.
*G09G 3/20* (2006.01)

(52) U.S. Cl.
CPC ....... *G09G 3/2096* (2013.01); *G09G 2370/10* (2013.01)

(58) Field of Classification Search
CPC ....... G09G 3/2096; G09G 3/3266; G09G 3/30
See application file for complete search history.

(56) References Cited

U.S. PATENT DOCUMENTS

| | | | | |
|---|---|---|---|---|
| 10,283,037 | B1 | 5/2019 | Far et al. | |
| 2002/0174282 | A1* | 11/2002 | Murakami | G06F 13/364 710/260 |
| 2004/0090186 | A1* | 5/2004 | Yoshida | G09G 3/325 315/169.1 |
| 2019/0080645 | A1 | 3/2019 | Chaji | |
| 2019/0164479 | A1* | 5/2019 | Miyasaka | G09G 3/3225 |
| 2019/0180684 | A1 | 6/2019 | Chaji et al. | |
| 2020/0234647 | A1* | 7/2020 | Lin | G09G 3/3266 |
| 2020/0410938 | A1 | 12/2020 | Moradi et al. | |

OTHER PUBLICATIONS

WIPO: International Search Report and Written Opinion relating to WO application No. PCT/CA2022/050931, dated Aug. 16, 2022.

* cited by examiner

*Primary Examiner* — Kevin M Nguyen

(57) ABSTRACT

The present invention discloses an optoelectronic system comprising an array of optoelectronic pixels or pixel arrays connected in rows and columns (or other two-dimensional arrays). The pixel arrays also have circuits and optoelectronic microdevices. The controller and driver-based enable the circuits in columns and rows upon an activation signal and pixel data packets. The signals involved can include but are not limited to input data, clocks, address, activation signals, read signals, or output data.

35 Claims, 5 Drawing Sheets

OPTOELECTRONIC ARRAY

BACKGROUND

The invention relates to an array of optoelectronic pixels or pixel arrays

SUMMARY

The present invention relates to an optoelectronic system comprising pixel arrays connected in rows and columns, the pixel arrays comprising circuits and optoelectronic microdevices and the circuits in columns receiving data signals wherein an activation signal passed between the circuits in columns captures data from data signals.

BRIEF DESCRIPTION OF THE DRAWINGS

The preceding and other advantages of the disclosure will become apparent upon reading the following detailed description and upon reference to the drawings.

Figure 1A:
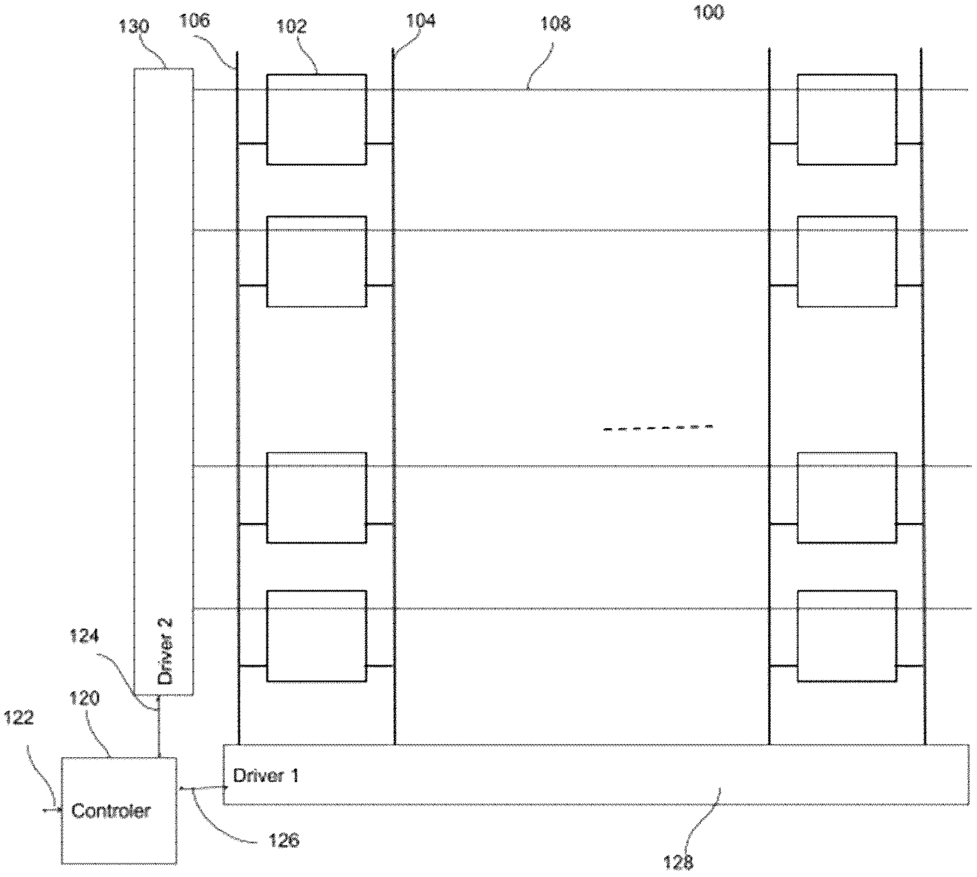
FIG. 1A shows an optoelectronic system includes an array of optoelectronic pixels or pixel arrays connected in rows and columns.

The present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

In this description terms "device" and "microdevice" are used interchangeably. However, it is apparently apparent to one skilled in the art that the embodiments described here are independent of the device size, detailed signal information, materials used, types of circuits used, and types of functional blocks [controller, drivers, etc.].

An optoelectronic system 100 includes an array of optoelectronic pixels or pixel arrays 102 connected in rows and columns (or other two-two-dimensional arrays). The pixel arrays 102 include circuits and optoelectronic microdevices. The circuits control the biasing conditions of the microdevices to create a signal or readout a signal.

FIG. 1

As shown in FIG. 1A, the system has a controller 120 that gets input signals (e.g., videos, picture images, etc.) and provides timing and signals 124 and 126 to drivers (130 and 128). The signals 124, and 126 can include but are not limited to input data, clocks, address, activation signals, read signals, or output data. The first driver 128 provides signals 106 to the array in the first direction (column). The first driver 128 may also read the signal 104 from the array in the same direction as the signal 106. The read signal 104 can provide information about the state of circuits, microdevices, or the impact of an external signal on the circuits or microdevices.

The second driver 130 can provide control signals 108 in the second direction different from the signal 106 direction (rows). The control signals can be the select signals, read, emissions, and other signals. There can be supply voltage lines (not shown) in either direction distributed in the array. Also not shown are display circuits that increase yield, like extra pixels, built-in self-test controllers, and output data lines for array analysis. The select signals enable the circuits in the second direction to store the data signal 106 from the first driver in the first direction. The emission signal enables the circuits to drive the microdevice in the pixel arrays 102. And the read signal provides access to a current, charge, or voltage extracted from the pixel arrays 102.

In some cases, the operation can include programming/biasing, driving/sensing, and so on. Here the programming can happen in sequential order where the select signal is activated, the data is stored for pixels in one of the rows (second direction). The select signal for another row (adjacent to the first row) is activated. The activation signal could activate one pixel, a group of signals, or a portion of the array. Also, the activation signal could be used to test patterns. Also, the activation signal could be used to activate a pixel to read the state of the pixel.

If the pixel array 102 has more than one pixel, the control and data signals 106 can be time modulated between the pixels. If the pixel array 102 has more than one pixel, the control and data signals 106 can be phase modulated between the pixels. If the pixel array 102 has more than one pixel, the control and data signals 106 can be both times and phase-modulated between the pixels.

Figure 1B:
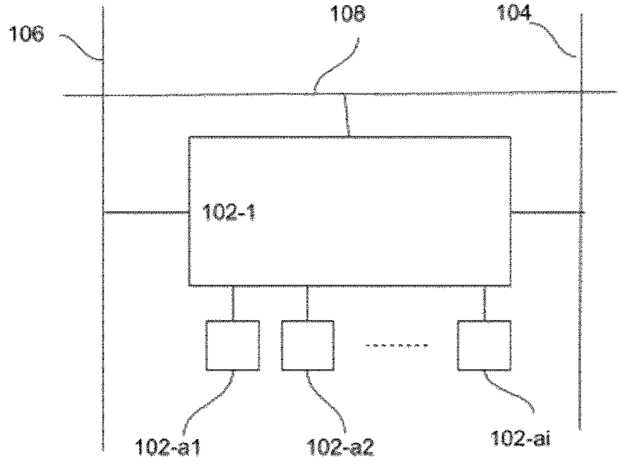
FIG. 1B shows a pixel array of structure where the circuit is connected to more than one microdevice.

FIG. 1B shows a pixel array of 102 structures where the circuit 102-1 is connected to more than one microdevice 102-*a*(1) to 102-*a*(i). The data signal 106, control signals 108, and other signals 104 are connected to circuit 102. The circuit has storage (not shown) that stores the data for biasing or driving the microdevices. The data, in one case, can be digital and stored in the circuit. The circuit may have other compatible circuits (not shown), such as a testing circuit, a fuse blow circuit, and a biasing circuit.

The data/bias signal 106 in the first direction can be digital. In the case of digital signals, the signal created by the second driver can be embedded in the first signals (data signals). As a result, the second driver for control signals can be removed. In return, the edge of system 100 can be narrower. In a related embodiment, circuit 102 in the first direction can have a number associated. The signal line 106 can include the address line before the actual signal. Circuit 102 is activated to store the signal after detecting the address. This architecture allows only selected circuits to be updated with new data. As it does not require all the array of circuits to be updated. This way, the array can read data faster and with less power.

Figure 1C:
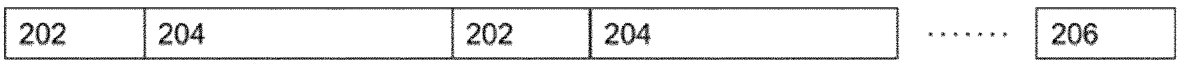
FIG. 1C shows an example of using the data signal as passing the control signals.

FIG. 1C shows an example of using the data signal as passing the control signals. The first part of the data in signal line 106 includes the address 202 of the pixel array that will be updated with new data. Circuit 102-1 in the pixel array has a part that can detect the address 202 portion of the signal 106, and if it matches the circuit address, it will capture the data portion 204 and store it in the storage portion of the circuit 102-1. The circuit then uses the data to bias or drive the microdevices 102-*a*(1) to 102-*a*(i) accordingly. The address portion 202 can also include other data, such as functionality. After the update on the first-pixel array, the following address is put on signal 202 and updates the 2nd circuit. There can be an extra portion in the data passed in signal line 106 that defines the function for the current or next state of the pixel array. The state can be driving, dimming, readout, etc. 206 can be another address representing the next pixel group. 206 could be other data to control the pixel with error correction or biasing information. Not shown, the address signal 202 and data signal 204 could also have additional blocks that could control the pixels not to be changed, the pixels to be cleared, or the pixel to come to a default state.

FIG. 2

Figure 2A:
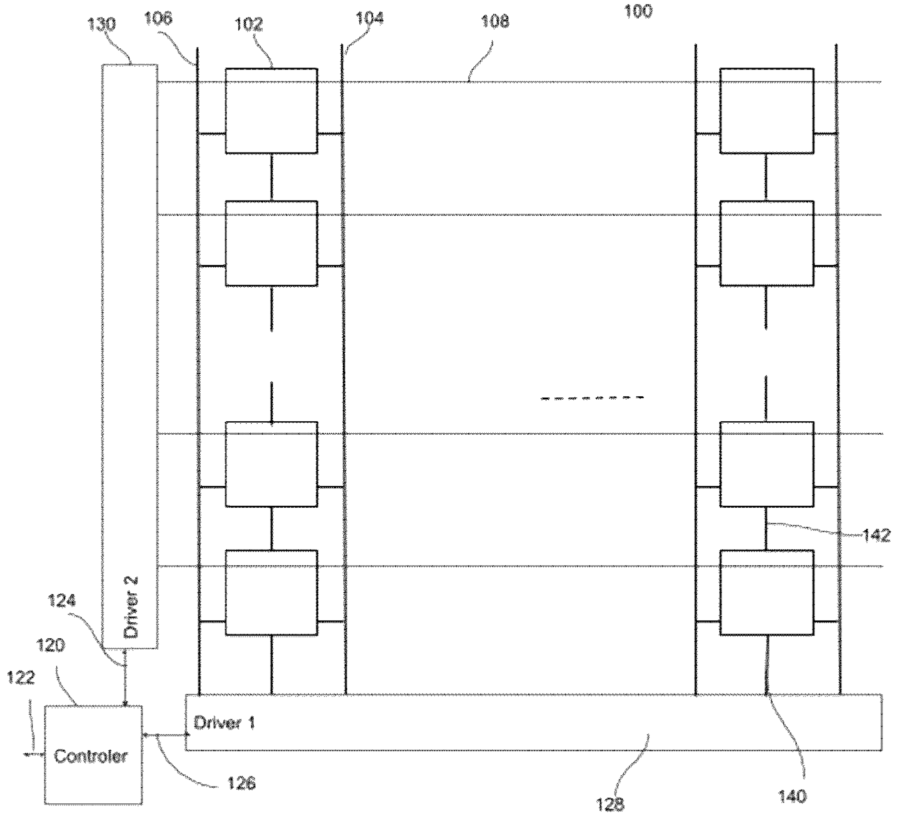
FIG. 2A shows a select signal in the first direction is passed between the circuits.

In FIG. 2A, another related case, a select signal 140 in the first direction is passed between the circuits 102. The select signal 140 has activation information. As it passes between circuit 102, the circuit gets activated; it stores the data from 106 (or passes the bias signal to 104) and then passes the signal to the following adjacent circuit. The circuit 102-1 also can have a pass-through mode that allows the activation signal 140 goes through the circuit 102-1 without activating the circuit to capture signal 106. Each column of circuit 102 in the first direction can have a separate activation signal 140. In a related embodiment, two or more columns can share the same activation signal. In one related embodiment, the activation signal 140 and the data signal 106 can be the same. A pattern on the data signal can either activate the capture mode or pass-through mode, or block mode in the circuit.

In one related case to the described embodiments, to the described embodiments, the circuit can drive more than one microdevice. For example, if the optoelectronic system has 3840×RGB×2160 pixels, the circuit can drive 10×rgb×10 pixel arrays. As a result, the number of data, control, and activation signals distributed in the array is reduced significantly. In this case, the 1st driver will have as low as 384 data signals. There can be 384 active signals. And the 2nd driver can have 216 control signals (or signal sets). As demonstrated in FIG. 2B, considering the number of signals is reduced significantly, one can drive them directly from the controller 124*b*, 126*b* (or other components) and eliminate the need for a direct 1st and 2nd driver for the display.

Figure 2B:
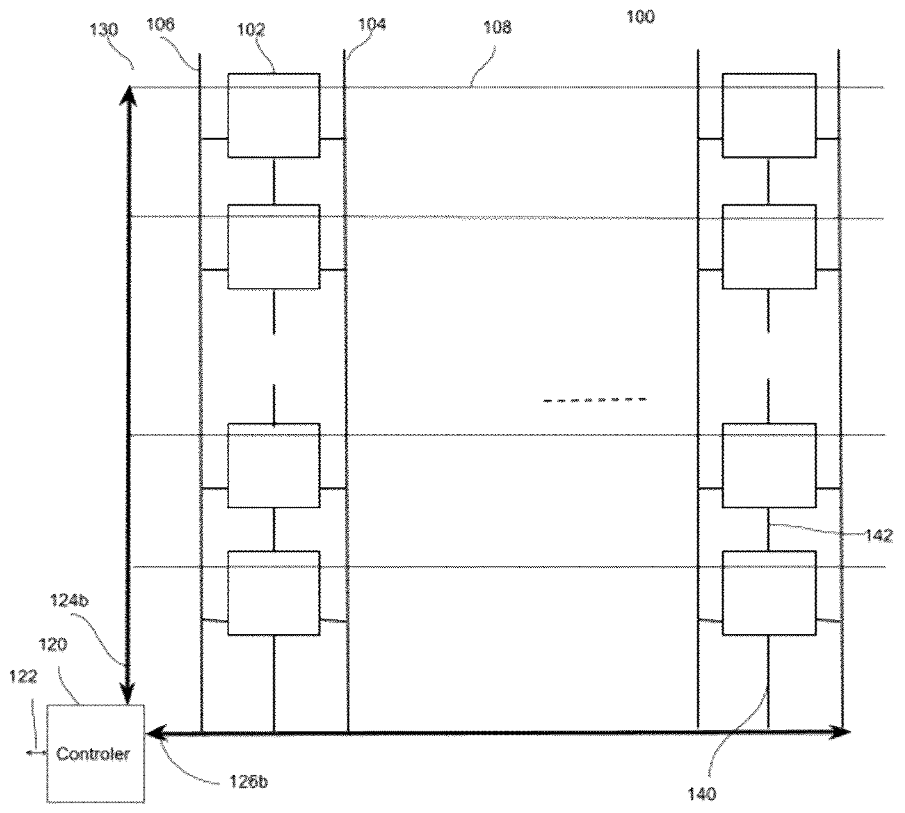
FIG. 2B shows the number of signals is reduced driving them directly from the controller.
Figure 2C:
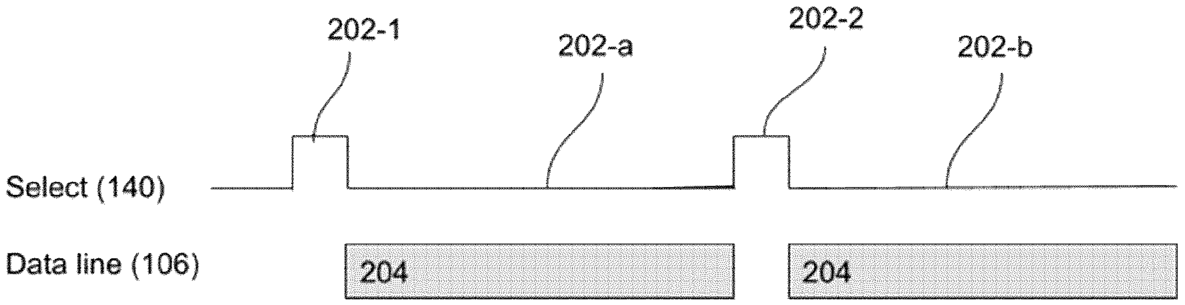
FIG. 2C shows the signal timing for select signal and data line.

FIG. 2C shows the signal timing for select signal 140 and data line 106. The select signal goes to activation mode 202-1 202-2, and the circuit captures the data on data signals 202-*a* and 202-*b*. The signal can be a simple enable/disable or some information coded in the line such as the address of the circuits, functionality mode of the circuit, pass-through mode, etc.

During the next phase 202-*a* the select signal is in non-active mode and the data 204 on the data line 106 is captured.

FIG. 3

Figure 3:
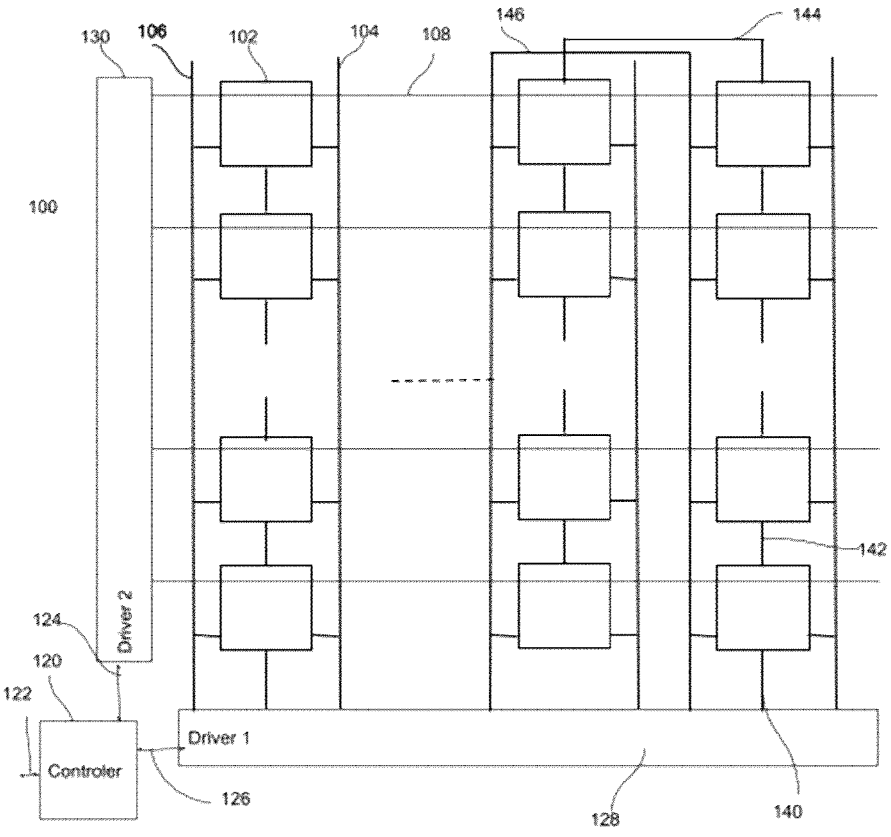
FIG. 3 shows the data or activation signals can be shared between at least two columns of circuits formed in the first direction.

To further reduce the number of signals, in another related embodiment, the data or activation signals can be shared between at least two columns of circuits formed in the first direction. In one related implementation, FIG. 3, the signal is passed from one column to the other column (144 and 146).

Here similar timing as FIG. 2B or FIG. 1C can be applied.

Further Embodiments

In one embodiment, the activation signal is an address of the circuits in the column. For example, an address can be a particular column element in the pixel array. An activation signal can be, for example, a simple pulse or an activation timing signal. An activation signal could also be a series of pulses that the column's element will decode. An activation signal could be, for example, a series of coded pulses, where any column can encode the correct series of coded pulses.

In one embodiment, the activation signal is an address of the circuits in the column and other information related to the circuits in the column, such as power information or security information, etc.

In another embodiment, a circuit is connected to more than one optoelectronic microdevice, and each circuit captures data for more than one pixel after an activation. For example, a pixel used in digital imaging is a picture element, the smallest addressable element in a raster image, or the smallest addressable element in an all-points-addressable display device, so it is the smallest controllable element of a picture represented on the screen.

In another embodiment, the activation signal enables an emission function. For example, an emission function is a signal that enables the circuits to drive the microdevice in the pixel arrays 102. And the read signal provides access to a current, charge, or voltage extracted from the pixel arrays 102.

In another embodiment, the activation signal is passed from one of the pixels in one column to another pixel in another column. For example, the activation signal coincides with the first pixel to extract the signal to control the first packet of information. The second activation signal is used for the second pixel to extract the second packet of information that controls the second pixel. In this way, the pixel data, speed of response, and power to the overall display are optimized.

In another embodiment, the controller controls both the creation of the activation signal and the data packets, organizing the correct data packet to the correct pixel. This is accomplished by mapping the total display image for a first image to pixels, then creating packets that should be sent to each pixel, organizing the various packets to arrive at the right ones to the right pixels so that the overall image will appear complete and continuous. It should be obvious to those skilled in the art that there are many ways to divide an image up into pixels, for example, a simple total data of the optical image divided by the total pixels to get a per-packet data set for each pixel or having some data be shared for adjacent pixels, so there is an overlap of the dataset at the boundaries, so the pixel to pixel display appears more continuous.

In another embodiment, the data is in a digital format. For example, the digital format can have a data structure that carries color, intensity, and timing data so that each pixel and the sub-pixel hardware components will render the correct pixel information.

In another example, the data is in a digital format and can comprise many types of information that the hardware in each pixel can interpret, for example, but not limited to Synchronization data. Since digital information is conveyed by the sequence in which symbols are ordered, all digital schemes have some method for determining the beginning of a sequence.

In another example, the data is in a digital format and can comprise many types of information that the hardware in each pixel can interpret, for example, but not limited to error data: Disturbances (noise) in analog communications invariably introduce some, generally slight deviation, or error between the intended and actual communication. Techniques such as check codes may detect errors and guarantee error-free communications through redundancy or re-transmission. Errors in digital communications can take the form of substitution errors in which a symbol is replaced by another symbol or insertion/deletion errors in which an incorrect symbol is inserted into or deleted from a digital message.

In another example, the data is in a digital format and can comprise many types of information that the hardware in each pixel can interpret, for example, but not limited to granularity data: The digital representation of a continuously variable analog value typically involves a selection of the number of samplings. The sampling determines the precision or resolution of the resulting datum.

In another example, the data is in a digital format and can comprise many types of information that the hardware in each pixel can interpret. For example, but not limited to compressibility: Digital data can be compressed and then uncompressed. Compression reduces the amount of bandwidth space needed to send information.

In another embodiment, the data signal is generated by a first driver. For example, under the control of the controller, the driver packages the data packets to go to each pixel. In electronics/computer hardware, a display driver is usually a semiconductor or printed integrated circuit (but may alternatively comprise a state machine made of discrete logic and other components), providing an interface function between a controller and a display device. The display driver will, for example, accept commands and data using an industry-standard general-purpose interface, such as TTL, CMOS, etc., and generate signals with suitable voltage, current, timing, and demultiplexing to make the display show the desired image. The display driver may be an application-specific microcontroller and incorporate RAM, Flash memory, EEPROM, and ROM. Fixed ROM may contain firmware and display fonts.

In another embodiment, a controller controls the first driver and the timing of the activation signal. For example, a video display controller or VDC (also called a display engine or display interface) can be a semiconductor or printed an integrated circuit that is the main component in a video-signal generator, a device responsible, for example, for the production of a TV video signal in a computing or game system.

In another embodiment, the controller is directly connected to the signal line. For example, the connector can be a printed wire material of al, alcu, alcusi, copper, silver, gold, etc. The signal line is designed to have length, width, and depth to enhance (lower) resistance and, simultaneously, lower capacitance. These optimized designs enhance signal data packet losses or errors.

In another embodiment, the circuits control biasing conditions of the microdevices to create a signal or readout of the signal. For example, a particular bias for a circuit could be an offset de voltage to raise an output signal up or down. A further example of biasing could be to bias the signals up for the data packets to ensure the data packets be driven to the pixels to maximize signal-to-noise ratios.

In another embodiment, the signals from the controller include input data, clocks, address, activation signals, read signals, or output data. For example, the signals for the controller may also include biased controls, security controls, and control signals related to error checking.

In another embodiment, the first driver reads the signal from the array in the first direction as the signal. For example, it may read each pixel state. It may re-read the data it was sent. It may read pixel errors. It may read pixels' voltages or currents.

In another embodiment, the read signal provides information about the state of the circuits, the microdevices, or the impact of an external signal on the circuits or the microdevices. For example, a microdevice may fail, and the read signal will determine failure. In another example, the read signal provides information on the written signal's quality to that pixel. In another example, the read signal provides information on the delta of the quality of the written signal from one time to another.

In another embodiment, the control signals are the select signals, read, emission, and other signals. In another example, the control signals could be test signals, error correction signals, biasing signals, quality checking signals, refresh signals, and the like.

In another embodiment emission signal enables the circuits to drive the microdevice in the pixel arrays. For example, the emissions signals can be standard TTL supply voltages. In another example, emission signals could voltage drive signals biased appropriately for the pixel. In another example, the emission signals can have a small signal superimposed on the drive voltage, allowing each pixel to get additional information, such as timing information.

In another embodiment, the read signal provides access to a current, charge, or voltage extracted from the pixel arrays. For example, the read signal may read the voltage of a pixel just written to the signal to test the signal degradation over time.

In another embodiment, programming happens in a sequential order where the select signal is activated. The data is stored for pixels in one of the rows. Then the select signal for another row is activated. For example, each row can be written in a sequence from the first-pixel column to the next adjacent pixel column. In another example, a first column then the odd columns are written first, followed by the even ones written, which may allow better array refreshing. In another example, the columns are activated based upon an algorithm, where an input codex from the controller may determine the algorithm.

In another embodiment, the pixel array has more than one pixel, and the control and data signals are time modulated between the pixels. In another example, these can be phase modulated. In another example, these may be modulated by some algorithm that may be a codex inputted from the controller.

In another embodiment, the data signal, control signals, and other signals are connected to the circuit. The circuit has storage that stores data for biasing or driving the microdevices, wherein further, the data for biasing is digital in the first direction. For example, the storage may be a RAM, ROM, EPROM, EEPROM, Flash ROM, or ASIC of FPGA.

In another embodiment, the data for biasing or driving microdevices is digital and stored in the circuit. In another example, the data for error checking is stored in the circuit. In another example, the data for refresh rates for driving the microdevices are stored in the circuit.

In another embodiment, the second driver for control signals is removable, and the system's edge is narrow. In another embodiment, the second driver for control signals may be left in the array but inactivated to save power.

In another embodiment, the circuit in the first direction has an address number associated with it, and the data signals include an address line before the actual signal.

In another embodiment, the circuit gets activated to store the data signal after it detects an address. For example, once the address is written, the pixel is accessed, and the data is written in the pixel. In another example, once the address is written, there is a synchronization timing delay until the pixel is accessed and the data is written in the pixel.

In another embodiment, the first part of the data in the data signal includes the address of the pixel array that is updated with new data. In another example, a part of the data signal includes start and stop bits. In another example, a part of the data signal includes error correction code bits. In another example, a part of the data signal interrupts information. In another example, a part of the data signal includes reset pixel information.

In another embodiment, a first circuit in the pixel array has a part that detects the address portion of the data signal. If it matches the circuit address, it captures the data portion and stores it in the storage portion of the first circuit.

In another embodiment, the address portion also includes other data for functionality. For example, a portion of the address data could be a biasing signal or a reference signal data.

In another embodiment, the following address is put on the data signal after an update on the first-pixel array and updates the following circuit. For example, each row can be written in a sequence from the first-pixel column to the next adjacent pixel column. In another example, a first column then the odd columns are written first, followed by the even columns being written, which may allow better array refreshing. In another example, the columns are activated based upon an algorithm, where an input codex from the controller may determine the algorithm.

In another embodiment, an extra portion of the data passed in the data signal defines a function for a current or subsequent state of the pixel array. Wherein further the state is driving, dimming, flashing, or readout. The extra portion passed in the data signal defined color information, hue information, and color cube information.

In another embodiment, the select signal in the first direction is passed between the circuits wherein the select signal has activation information. For example, the activation signal may be a signal pulse of a specific time. In another example, the activation may be a group of pulses with a particular voltage, timing, and duty cycle.

In another embodiment, the first circuit is activated, and it stores the data from the data signal or passes the bias signal and then passes the data signal to the following adjacent circuit.

In another embodiment, the first circuit also has a pass-through mode that allows the activation signal goes through the first circuit without activating the circuit to capture the data signal. In another example, the first circuit has a jump mode to jump any number of pixels referenced. In another example, the first circuit has a toggle mode to toggle between two pixels of a group of pixels. In another example, the first circuit has group mode, where a group of pixels is activated simultaneously.

In another embodiment, each circuit column in the first direction has a separate activation signal. For example, each column, when activated, has the same signal. For example, the activation signal may be a signal pulse of a specific period. In another example, the activation may be a group of pulses with a particular voltage, timing, and duty cycle.

In another embodiment, two or more columns share the same activation signal. In another example, the column activation signal may also have a pass-through mode that allows the activation signal goes through the first circuit without activating the circuit to capture the data signal. In another example, the second activation signal has a jump mode to jump any number of pixels referenced. In another example, the second activation has a toggle mode to toggle between two pixels of a group of pixels. In another example, the second activation has group mode, where a group of pixels is activated simultaneously.

In another embodiment, the activation signal and the data signal are the same. A pattern on the data signal activates a capture mode, the pass-through mode, a block mode, or a group mode in the circuit.

In another embodiment, a signal timing for the select signal and the data signal, the select signal goes to the activation mode, and the circuit captures this select signal.

In another embodiment, the select signal is a simple enable/disable instruction coded in a line such as the address of the circuits, functionality mode of the circuit, or pass-through mode. For example . . . .

In another embodiment, in a subsequent phase, the select signal is in a non-active mode, and the data on the data signal is captured. For example . . . .

In another embodiment, the data or activation signals are shared between at least two columns of circuits formed in the first direction. For example . . . .

In another embodiment, the data signal is passed from one column to the other. For example, each column can be enabled in a sequence from the first-pixel column to the next adjacent pixel column. In another example, a first column then the odd columns are written first, followed by the even columns being written, which may allow better array refreshing. In another example, the columns are activated based upon an algorithm, where an input codex from the controller may determine the algorithm.

While particular embodiments and applications of the present invention have been illustrated and described, it is to be understood that the invention is not limited to the precise construction and compositions disclosed herein and that various modification, changes, and variations can be apparent from the preceding descriptions without departing from the spirit and scope of the invention as defined in the appended claims.

The invention claimed is:

1. An optoelectronic system, the system comprising:

pixel arrays connected in rows and columns, the pixel arrays comprising circuits and optoelectronic microdevices and the pixel arrays being controlled by pixel data packets; and a controller and drivers, the controller and drivers enable the circuits in columns and rows upon an activation signal and pixel data packets, the pixel data packets controlling at least two functions of the pixel, wherein, the activation signal is daisy chained between the columns and wherein further the pixel array has more than one microdevice and the circuit is connected to more that one microdevice, the activation signal is a signal passed between the circuits, and wherein the circuit gets activated to store the data signal after it detects an address or receives an activation signal.

2. The system of claim 1, where the activation signal is an address of the circuits in the column.

3. The system of claim 2, wherein a first part of the data in the data signal includes an address of the pixel array that is updated with a new data.

4. The system of claim 3, wherein two or more columns share the same activation signal.

5. The system of claim 1, where the circuit is connected to more than one optoelectronic microdevice and each circuit capture data for more than one pixel after activation.

6. The system of claim 1, where activation signal can enable other function such as emission.

7. The system of claim 1 where the data is digital format and wherein a programming happens in a sequential order where a select signal is activated and the data is stored for pixels in one of the rows and then the select signal for another row is activated.

8. The system of claim 1 where the data is generated by a first driver.

9. The system of claim 1 where the controller controls a first one of the drivers and activation signal timing.

10. The system of claim 1 wherein the controller is directly connected to the data line.

11. The system of claim 1, wherein the circuits control biasing conditions of the microdevices to create a signal or readout the signal.

12. The system of claim 1, wherein signals from the controller include input data, clocks, address, activation signals, read signals or output data, and wherein the data signal, control signals and other signals are connected to the circuit and the circuit has a storage that stores data for biasing or driving the microdevices.

13. The system of claim 1, wherein a first one of the drivers reads the signal from the array in a first direction as the signal wherein the data for biasing or driving microdevices is digital and stored in the circuit.

14. The system of claim 1, wherein the activation signal is a signal passed between the circuits and wherein the read signal provides information about a state of the circuits, the microdevices or the impact of an external signal on the circuits or the microdevices.

15. The system of claim 14, wherein the data for biasing is digital in a first direction.

16. The system of claim 14, wherein the circuit in a first direction has a number associated with it and the data signals include an address line prior to the actual signal.

17. The system of claim 16, wherein the first circuit also has a passthrough mode that allows the activation signal goes through the first circuit without activating the circuit to capture data signal.

18. The system of claim 1, wherein the activation signal is a signal passed between the circuits wherein control signals are select signals, read, emission and other types of signals.

19. The system of claim 1, wherein the activation signal is daisy chained between the columns and wherein select signals enable the circuits in a second direction to store the data signal from a first one of the drivers in a first direction.

20. The system of claim 19, wherein a second driver for control signals is removable and an edge of the system is narrow.

21. The system of claim 20, wherein the first circuit is activated, and it stores the data from the data signal or passes a bias signal and then passes the data signal to the next adjacent circuit.

22. The system of claim 20, wherein in a signal timing for the select signal and the data signal, the select signal goes to the activation mode and the circuit captures this select signal.

23. The system of claim 20, the data or activation signals are shared between at least two columns of circuits formed in the first direction.

24. The system of claim 1, wherein the activation signal is daisy chained between the columns and wherein an emission signal enables the circuits to drive the microdevice in the pixel arrays.

25. The system for claim 1, wherein the activation signal is a signal passed between the circuits and wherein for the pixel array having more than one pixel, the control and data signals are time modulated between the pixels and wherein a first circuit in the pixel array has a part that detects the address portion of the data signal and if it matches the circuit address, it captures the data portion and stores it in the storage portion of the first circuit.

26. The system of claim 1, wherein the circuit then uses the data to bias or drive the respective microdevices accordingly.

27. The system of claim 1, wherein an address portion also includes other data for functionality.

28. The system of claim 27, wherein a select signal is a simple enable/disable instruction coded in a line such as the address of the circuits, or functionality mode of the circuit, or pass through mode.

29. The system of claim 1, wherein the after an update on the first pixel of the pixel array, the next address is put on the data signal and updates the next circuit.

30. The system of claim 29, wherein in a next phase a select signal is in a non-active mode and the data on the data signal is captured.

31. The system of claim 1, wherein an extra portion in the data passed in data signal defines the function for a current state or a next state of the pixel array, wherein further the state is driving, dimming or readout.

32. The system of claim 1, wherein a select signal in a first direction is passed between the circuits wherein the select signal has activation information.

33. The system of claim 32, wherein the signal is passed from one column to the other column.

34. The system of claim 1, wherein each column of the circuit in a first direction has a separate activation signal.

35. The system of claim 1, wherein the activation signal and the data signal are the same and a pattern on the data signal either activates a capture mode or the passthrough mode or a block mode in the circuit.

* * * * *